United States Patent [19]
Jasinski et al.

[11] Patent Number: 5,559,512
[45] Date of Patent: Sep. 24, 1996

[54] METHOD AND APPARATUS FOR ENTERING ALPHA-NUMERIC DATA

[75] Inventors: Vincent J. Jasinski, Grand Rapids; Mark W. Briggs, Holland, both of Mich.

[73] Assignee: Venturedyne, Ltd., Milwaukee, Wis.

[21] Appl. No.: 406,743

[22] Filed: Mar. 20, 1995

[51] Int. Cl.⁶ .................................................. H03K 17/94
[52] U.S. Cl. ....................................... 341/22; 364/709.12
[58] Field of Search ............................. 379/96, 354, 368, 379/396; 364/709.12, 709.16, 710.08, 710.09, 709.14, 709.15; 345/172, 173; 341/23, 22; 400/485

[56] References Cited

U.S. PATENT DOCUMENTS

| | | | |
|---|---|---|---|
| 4,078,257 | 3/1978 | Bagley | 341/23 |
| 4,333,097 | 6/1982 | Buric et al. | 340/711 |
| 4,447,692 | 5/1984 | Mierzwinski | 219/10.55 B |
| 4,680,728 | 7/1987 | Davis, II et al. | 364/900 |
| 4,709,387 | 11/1987 | Masuda | 379/354 |
| 4,737,980 | 4/1988 | Curtin et al. | 379/97 |
| 4,803,463 | 2/1989 | Sado | 341/23 |
| 4,821,029 | 4/1989 | Logan et al. | 345/173 |
| 4,885,575 | 12/1989 | Williams | 341/23 |
| 4,885,580 | 12/1989 | Noto et al. | 341/23 |
| 4,897,651 | 1/1990 | De Monte | 341/23 |
| 4,914,624 | 4/1990 | Dunthorn | 345/173 |
| 4,916,740 | 4/1990 | Noda et al. | 382/59 |
| 4,964,075 | 10/1990 | Shaver et al. | 364/900 |
| 4,999,795 | 3/1991 | Lapeyre | 364/709.16 |
| 5,003,505 | 3/1991 | McClelland | 345/173 |
| 5,007,008 | 4/1991 | Beers | 364/709.15 |
| 5,031,119 | 7/1991 | Dulaney et al. | 345/173 |
| 5,067,103 | 11/1991 | Lapeyre | 364/709.16 |
| 5,124,940 | 6/1992 | Lapeyre | 364/709.16 |
| 5,128,672 | 7/1992 | Kaehler | 341/23 |
| 5,281,966 | 1/1994 | Walsh | 341/22 |
| 5,303,288 | 4/1994 | Duffy et al. | 379/354 |
| 5,339,358 | 8/1994 | Danish | 379/368 |

FOREIGN PATENT DOCUMENTS

| | | |
|---|---|---|
| 5-10566 | 1/1993 | Japan. |
| 1711130A1 | 2/1992 | Russian Federation. |

Primary Examiner—John K. Peng
Assistant Examiner—Timothy Edwards, Jr.
Attorney, Agent, or Firm—Jansson & Shupe, Ltd.

[57] ABSTRACT

A method for entering data comprised of alpha, numeric and/or symbolic characters includes providing a plurality of hard keys, each of which is identified with two alpha characters. Such hard keys are preferably provided in a key matrix (not unlike a telephone key matrix) wherein all of the alpha characters of a particular alphabet are represented on such hard keys. Such method also includes providing two "display-type" soft keys, each for displaying an alpha character appearing on one of the hard keys and selected by actuating such key. A different alpha character is thereby displayed at each of the soft keys. That soft key displaying the alpha character desired to be entered is then actuated, thereby entering the displayed alpha character into the data field being edited. A new apparatus is also disclosed.

14 Claims, 4 Drawing Sheets

New Data: JN

| M | N | O | | |

FIG. 4A

New Data: JO

| M | N | O | | |

FIG. 4B

METHOD AND APPARATUS FOR ENTERING ALPHA-NUMERIC DATA

FIELD OF THE INVENTION

This invention relates to selective visual display systems and, more particularly, to such systems used for adjunctively creating and editing relatively-limited data fields which include primarily alpha and numeric data.

BACKGROUND OF THE INVENTION

In computerized data entry and visual display systems, a need often arises to either edit data already entered or enter new data. A common way to provide that capability (and the way which offers the broadest range of capabilities for entering alpha, numeric and symbolic data) is to use a full size "writer-style" key board and appropriate software. Key boards of that type, nearly always used with personal computers, have a length in excess of sixteen inches and a top area in excess of one hundred forty square inches.

But there are certain types of systems where one needs only a relatively-narrow range of capabilities to be used as an adjunct to the primary system. In those situations, a standard writer-style key board would be intolerably large. Examples of such systems having only limited data-editing and/or data-entry capabilities are shown in U.S. Pat. Nos. 4,680,728 (Davis, II et al.), 4,737,980 (Curtin et al.) and 5,007,008 (Beers).

The Davis, II et al. patent describes a method for entering data using a 10-key key board with the keys numbered 0 to 9. During editing, a screen displays several clusters of characters with each character of each cluster corresponding in position to that of one of the numbered keys. When a particular cluster is "active," depressing the numbered key corresponding in position to the character to be selected from that cluster causes such character to appear in the field being edited.

The Curtin et al. apparatus uses the telephone key pad and a small display panel which is either built into the telephone or provided as part of an auxiliary controller. Each key of the key pad is marked with three alpha characters and one numeric character but not all of the characters of the English-language alphabet appear on such key pad.

In operation, the user depresses a key and all four characters are displayed. A computer generates a "best guess" as to which of the characters is actually desired and displays such character in the first character location. Clearly, the character selected by the computer may be incorrect and the user will have to continue other steps to obtain the desired character.

The Beers patent describes ways to cause depression of a particular key to display any one of two or more symbols. Such ways relate to how often the key is depressed in sequence, how long the key is held down before release or when the key is depressed during a pending time period.

Since the apparatus depicted in the Davis, II et al. patent uses a screen which displays several clusters of characters, a relatively large-area screen is seemingly needed. At the least, the Davis, II et al. apparatus appears to be a step away from the compactness needed for certain types of applications.

An obvious disadvantage of the Curtin et al. arrangement is that the user does not always immediately obtain display and entry of the desired character. If the computer guesses incorrectly, further user manipulation is needed to obtain such character. And there may be no provision for editing existing data fields, only for entering new data.

The Beers method and apparatus seems somewhat awkward and "non-intuitive" in use. The symbol displayed depends upon the number of key depressions, the duration of a key depression or the instant of a key depression relative to a period of time.

An improved method and compact apparatus for adjunctively editing a relatively-small, existing data field and for creating new data fields would be an important advance in the art.

OBJECTS OF THE INVENTION

It is an object of the invention to provide an improved method and apparatus which overcomes some of the problems and shortcomings of the prior art.

Another object of the invention is to provide an improved method and apparatus for quickly and conveniently editing a relatively small, existing data field and for entering new data in a relatively small field.

Yet another object of the invention is to provide an improved method and apparatus wherein, with one or two correct key strokes, the user always obtains display of the desired character.

Another object of the invention is to provide an improved method and apparatus which permits essentially-instantaneous rectification of an inadvertent key stroke error.

Another object of the invention is to provide an improved data-entry and editing apparatus which is very compact.

Still another object of the invention is to provide an improved method and apparatus which requires a very small field display area. How these and other objects are accomplished will become apparent from the following descriptions and from the drawing.

SUMMARY OF THE INVENTION

The new method and apparatus were developed for adjunctive use with a system, the primary data of which is numeric and is entered or modified using a conventional numeric key board. The invention contemplates that when using such system, there may be a need to edit, by substituting alpha characters (and, sometimes, numeric characters), a data field which includes only limited data. Such a field may identify a particular user, a particular file or the like and may include date and time information.

The method uses character-by-character editing techniques applied to a new field created at a location other than that of the field to be edited. In the new field, there is identified the location of a new character to later be substituted for a particular character (or, perhaps, for a space) in the existing data field. New characters are entered in sequence and after all of such characters are entered in the newly-created data field, such new field is substituted for the existing data field which had been selected for editing.

In general, the new method for entering data comprised of alpha characters includes the steps of providing a plurality of so-called "hard" keys, a definition for which is set out near the end of this specification. Each hard key is identified with at least two alpha characters and, most preferably (to limit the number of hard keys to a reasonable number), with more than two alpha characters.

A plurality of so-called "soft" keys is also provided and a definition for such soft keys also appears near the end of this specification. In a highly preferred method, the number of soft keys provided is at least equal to the maximum number of alpha characters on any hard key.

One of the hard keys is actuated, thereby displaying a different alpha character at each of the soft keys. That soft key which displays the alpha character desired to be substituted in the data field is actuated and such displayed alpha character is thereupon entered.

In a more specific aspect, data may be entered for either of two data fields. The method includes the step of selecting the field for which data is to be entered. Further, the field for which data is to be entered is displayed at a first location and the method includes creating a new field at a second location by, e.g., entering alpha characters at such second location. At the conclusion of data entry, the field at the first location is replaced with the field newly-created at the second location.

Another aspect of the invention was developed in recognition of the probability that a system user may also have occasion to edit data which includes at least one numeric character. Each of the plurality of hard keys is further identified with a single, different numeric character. Such character is identified as a default character. That is, when a hard key is actuated, the default character appears in the data field. Unless a soft key is actuated after actuating a hard key and before actuating another hard key, the default numeric character remains in the data field.

Other aspects of the new method recognize the likelihood that a user will sometimes make a mistake while editing. For example, after actuating one of the hard keys (thereby displaying a different alpha character at each of the soft keys), the user may inadvertently actuate a soft key displaying an undesired alpha character. In the new method, the error is easy to correct. The user need only actuate the soft key displaying the correct alpha character desired to be entered. That step removes the undesired alpha character and substitutes therefor the alpha character desired to be entered.

Yet another aspect of the invention involves an improvement for an apparatus for entering data comprised of alpha characters. Such apparatus is of the type including a display panel and a key board comprised of a plurality of hard keys. Each hard key is identified by two (and, perhaps, more) alpha characters. The improvement comprises a plurality of soft keys. Assuming one of the hard keys is actuated, each of the soft keys displays a different alpha character corresponding to one of the alpha characters of the actuated hard key.

The new apparatus has two data fields, namely, a first data field at a first location and a new data field at a second location. Before undertaking editing, i.e., prior to actuating a hard key (or a hard and soft key), the first and the new data fields differ from one another in that the new field is blank and includes no alpha or numeric characters.

If a hard key is actuated, the new data field includes the numeric character appearing on the actuated hard key. If that or another hard key is next actuated, the new data field includes (at the next position in the new field) the numeric character appearing on the next-actuated hard key. On the other hand, if a soft key is actuated in sequence after actuating a hard key, the alpha character displayed on that actuated soft key will be substituted in the new field for the numeric character of the just-previously-actuated hard key. In that way, the new data field is made to include the alpha character displayed by the last-actuated soft key.

Other details regarding the new method and apparatus are set forth in the following detailed description and in the drawings.

BRIEF DESCRIPTION OF THE DRAWINGS

FIGS. 4A and 4B comprise a sequential depiction of portions of the screen of FIG. 2A and illustrate entry of an erroneous alpha character and correction of such entry.

DETAILED DESCRIPTION OF PREFERRED EMBODIMENTS

In appreciating the specification and the claims, it will be helpful to have an understanding of some of the terminology used to describe the invention. Terminology definitions appear near the end of the specification.

Figure 1:
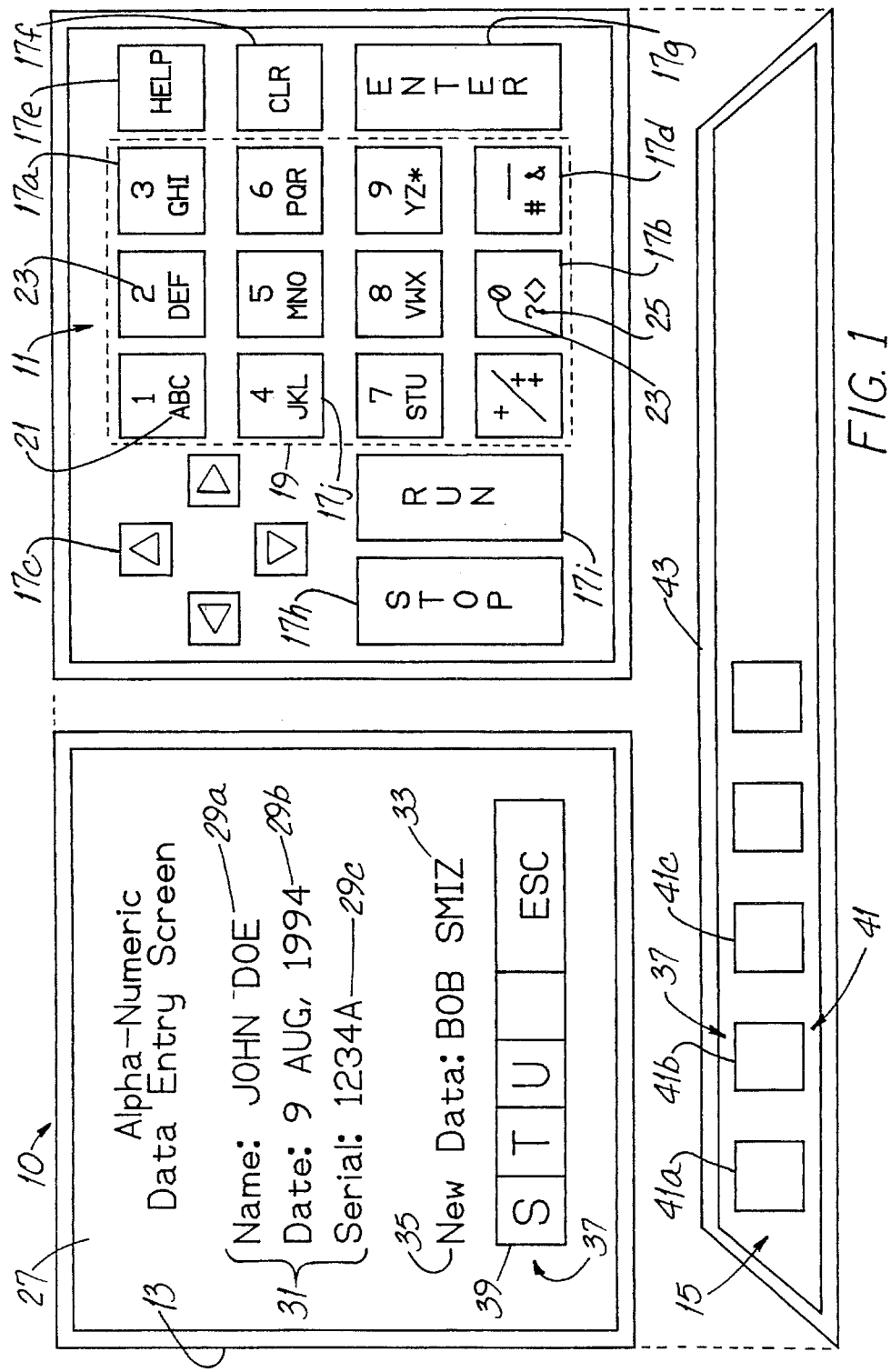
FIG. 1 is a front elevation view of an exemplary embodiment of the new apparatus.

Referring first to FIG. 1, the new apparatus 10 will be described. That description is followed by a description of methodology which may be carried out using such apparatus 10.

The new apparatus 10 has a key board 11 and a companion display panel 13. The board 11 and panel 13 may be in separate three-dimensional enclosures but in the illustrated embodiment, configured for a specific application, the board 11 and the panel 13 (the former including a touch face 15) are generally planar and mounted on the same Mylar® sheet. But the precise configuration depends at least in part upon the constraints of the specific application.

The key board 11 has a plurality of keys 17a (circumscribed by the dashed line 19), each of which is identified by two or three alpha characters 21 and by a single numeral 23. Such keys 17a may be referred to as "hard keys" or, more specifically, as "alpha hard keys."

The board 11 also includes a key 17b which is free of alpha characters 21 and has a single numeral 23 and one or more symbols 25. Such key 17b may also be referred to as a hard key or, more specifically, as a "numeric hard key." Other hard keys 17 on the board 11 include arrow keys 17c for moving a cursor-like field selector block, plural-symbol keys 17d, HELP, CLEAR and ENTER keys 17e, 17f and 17g, respectively, and STOP and RUN keys 17h, 17i. In a specific embodiment, all of the aforedescribed keys 17 on the key board 11 are of the "touch" membrane-type.

The display panel 13 has a screen 27 which includes several different data fields 29a, 29b and 29c. In the exemplary illustration, such fields are for a name, a date and a serial number, respectively, but of course, other field "identifiers" can be used to suit the application. In this specification, the fields 29a, 29b and 29c are said to be at a first location 31.

In one embodiment, the panel screen 27 also has a new data field 33 at a second location 35 and as described below, it is at the new field 33 where characters are entered during the data entry and data editing process. After the new field 33 is in the form desired by the user, such newly-created field 33 is used to replace a field 29a, 29b or 29c at the first location 31.

Near the bottom of the panel 13 is a plurality of soft keys 37, the identifying nomenclature for which is changed from time to time. In the specific illustrated embodiment, each soft key 37 has two aspects. Such aspects include a pseudo-key 39 and a touch key 41. The pseudo-keys 39 appear on the screen with identifying nomenclature, look like "real" keys and invite touching for data entry or editing. But, in fact, nothing occurs if they are touched.

The touch keys 41 include membrane-type key pads, have no identifying nomenclature and are "linked" (both visually and by computer software) to respective pseudo-keys 39 by the fact that the touch keys 41 are in position correspondence with their respective pseudo-keys 39. In result, actuating a touch key 41 actuates the corresponding pseudo-key 39. And, of course, there is no technical reason why the apparatus 10 could not be configured so that the pseudo-keys 39 and the touch keys 41 are "merged," either on the screen 27 or on the touch bar 43.

Figure 2B:
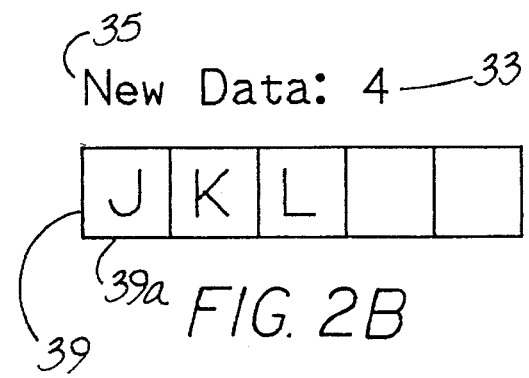
FIGS. 2B–2E comprise a sequential depiction of portions of the screen of FIG. 2A during entry of data comprised of alpha characters.
Figure 2C:
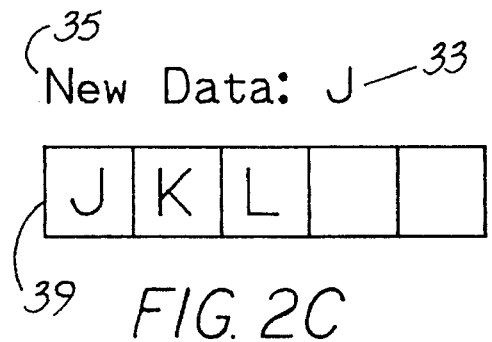
Figure 2D:
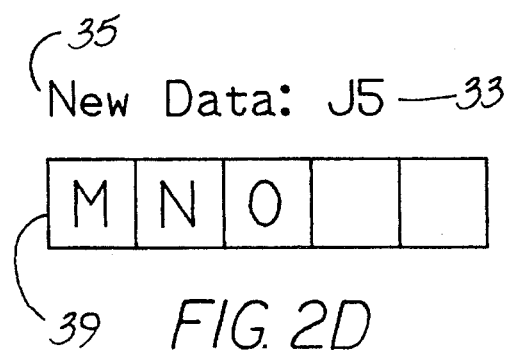
Figure 2E:
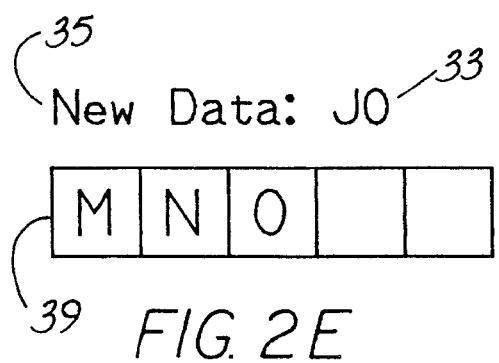
Figure 2A:
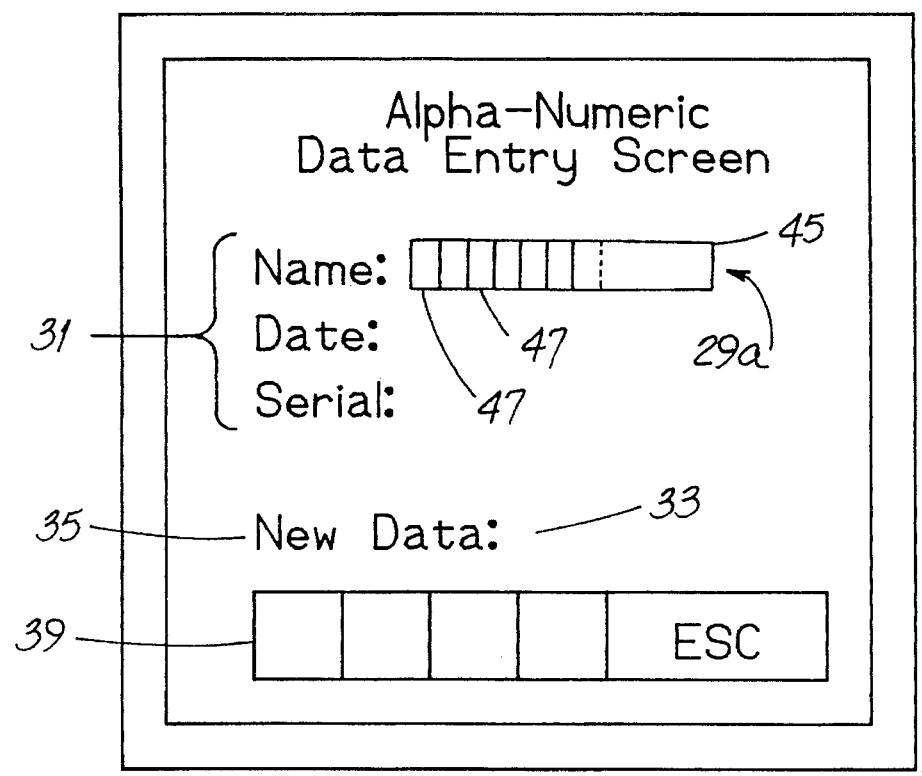
FIG. 2A is a front elevation view of the screen of the apparatus of FIG. 1.

Details of the mew method will now be described by way of some examples. In the first example, described in connection with FIGS. 2A–2D, it is assumed the user wishes to enter a modest amount of data and has operated the apparatus 10 so that the screen 27 appears as shown in FIG. 2A. It is also assumed that the keys 17 have been stroked until the block 45 is at the field 29a of the first location 31. It is further assumed that the data to be entered at the field 29a is the name JOHN DOE.

To do so, the user actuates the hard key 17j, the alpha characters of which include the letter J and the sole numeric character of which is 4. As shown in FIG. 2B, actuation of such key 17j causes the number 4 to appear in the new data field 29a now being created. (For the key 17j, the "default" character is 4.) Simultaneously, the alpha characters of the key, J, K, L, appear on the pseudo-keys 39. The user then actuates a soft key 37, namely, the touch key 41a corresponding to the pseudo-key 39a and the letter J is substituted for the number 4. The screen thereupon appears as in FIG. 2C.

Next, the user actuates the hard key 17 including the number 5 and the letters M, N and O. The screen 27, data field 29a and pseudo-keys 39 thereupon appear as in FIG. 2D. The touch key 41c corresponding to the letter O is then actuated and the letter O is substituted for the default character, the number 5, as shown in FIG. 2E. After the field 33 at the second location 35 is created using steps which are now apparent, the user actuates the ENTER key 17g and the blanks at various positions 47 in the field 29a are replaced with the new field 33.

It should be noted that if, prior to undertaking the steps of the first example, the field 29 identified by the block 45 already included another name, the end result would be the same. That is, using the above steps, the name JOHN DOE would be substituted for such other name.

In another embodiment, data is entered in an existing field, e.g., field 29a, 29b or 29c, without using a new data field 33. Continuing reference to FIG. 1, it is assumed the user wishes to enter the name JOHN DOE in the field 29a. Such entry is to be made, irrespective of whether the field 29a is blank or whether it includes other data.

To enter such data, the block 45 is positioned at the field 29a and unless automatically positioned by the software, the curser is placed at the leftmost position 47. If the field 29a includes other data, such data may be deleted manually or automatically, the latter upon the first depression of any hard key as described in the next paragraph.

Thereafter, the hard key 17j is depressed since such key 17j includes the character J to be first entered. If deletion of existing data is automatic, depression of such key 17j will delete the data in the field 29a. Depressing such key 17j will also cause the characters J, K and L to appear in sequence at the soft keys 37 and at the touch keys 41. Thereupon, the touch key 41a (which displays the character J) is touched and the character J is immediately entered at the first position 47 in the field 29a.

For the next example, described in connection with FIGS. 3A–3D, it is assumed that the user wishes to enter the serial number 732 at the field 29c of the first location. To do so, the arrow keys 17c are manipulated until the block 45 "overlays" such field 29c.

Figure 3A:
FIGS. 3A–3D comprise a sequential depiction of portions of the screen of FIG. 2A during entry of data comprised of numeric characters.

The user then actuates the hard key 17, the sole numeric character of which is 7 and the alpha characters of which are S, T and U. As shown in FIG. 3A, actuation of such key 17 causes the number 7 to appear in position 47a the new data field 33 now being created.

Figure 3B:

As a next step, the hard key 17 including 3 and G, H and I is actuated and when such key 17 is actuated, its numeric character 3 appears in the positions 47b at the second location 35 and its alpha characters G, H and I appear in the pseudo-keys 39 as shown in FIG. 3B. (It is to be noted that after actuating the hard key as described immediately above, no touch key 41 is actuated, notwithstanding that the alpha characters S, T and U are displayed in the pseudo-keys 39.)

Figure 3C:
Figure 3D:

As a next step (and ignoring the characters G, H and I of the pseudo-keys 39), the user actuates the hard key 17 including 2 and D, E, F and the numeral "2" appears in the position 47c as shown in FIG. 3C. The characters D, E and F displayed in the pseudo-keys 39 are ignored. The user then actuates the ENTER key 17g and the blanks at various positions 47a–47c in the data field 29c are replaced with the new field 33 which includes the serial number 732. The screen 27 then appears as shown in FIG. 3D.

Figures 4A, 4B:
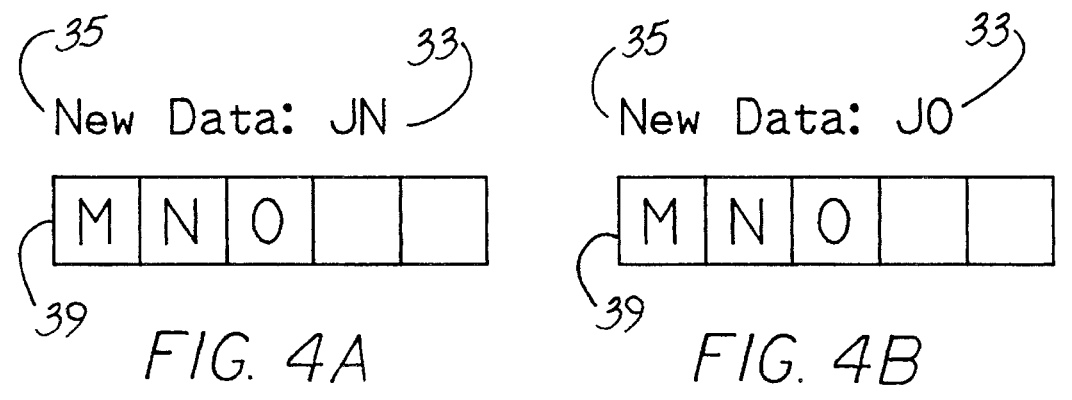

For the next example and considering the above-described example involving FIGS. 2A–2E and entry of the name JOHN DOE, it is assumed that while attempting to enter the letter O in the name JOHN, the user inadvertently actuated the touch key 41b displaying the undesired alpha character N rather than key 41c displaying the character O. In that event, the screen 27 (and particularly the new data field 33) would appear as in FIG. 4A rather than as in FIG. 2E.

In that event, the user need only actuate the touch key 41c displaying the alpha character O that is desired to be entered. The undesired character is thereby removed, the alpha character desired to be entered is substituted therefor and the screen would appear as in FIG. 4B.

As used herein, an alpha character is a letter of any alphabet. A numeric character is a single digit in a numbering system, e.g., the digit 8 in the Arabic numbering system or the digit III (corresponding to Arabic 3) in the Roman numbering system.

A hard key 17 is a key, the nomenclature of which is not changed or is changed only occasionally. Examples of one type of hard key are the depressible three-dimensional keys on a telephone key pad. Hard keys 17 of that type (even though of the two-dimensional "touch" type) are illustrated in FIG. 1.

A soft key 37 is a key, the nomenclature of which changes or can change as the method or apparatus 10 is used. The soft keys 37 illustrated in FIG. 1 are of the two-dimensional display-and-touch type for which the displayed identifying characters may be and are changed during data editing using appropriate computer software. In recognition of the differing ways to provide a soft key 37, a pseudo-key 39 and a touch key 41 are collectively referred to as a soft key 37.

While the principles of the invention have been shown and described in connection with specific embodiments, it is to be understood clearly that such embodiments are exemplary and not limiting. For example, FIG. 1 shows nine hard keys 17, each identified by two or more letters of the English-language alphabet. All letters of such alphabet appear on the nine keys 17 and, including the numeric hard key 17b, all numerals 0 through 9 of the Arabic system appear on hard keys 17.

With an alphabet having twenty-six characters, the number of alpha-character hard keys 17, nine, is a reasonable compromise between having a separate hard key 17 for each alpha character and a single hard bar-like key having all twenty-six alpha characters thereon and used with twenty-six accompanying soft keys 37, one for displaying each alpha character.

However, the apparatus 10 and method are not limited to key boards using (predominantly) three alpha characters per hard key 17, single numerals per hard key 17, use with the English-language alphabet and/or use with the Arabic numeral system. Nor is the apparatus 10 limited to three-dimensional keys which are depressed some distance, to two-dimensional membrane-type keys which are touched (or arguably depressed a very small distance) or to heat-sensing keys which are only touched. Such apparatus 10 may be adapted for use with other key/character combinations, other alphabets, other numbering systems and/or other types of keys or hardware. Such adaptations are contemplated by and within the scope of the invention.

What is claimed is:

1. A method for entering data comprised of characters and including the steps of:

providing a plurality of hard keys arranged within an area, each of the hard keys being identified with two characters;

providing two soft keys at locations away from the area;

actuating one of the hard keys, thereby displaying a different character at each of the soft keys; and actuating the soft key displaying the character desired to be entered.

2. The method of claim 1 wherein data may be entered for either of two data fields and the method includes the step of:

selecting the field for which data is to be entered.

3. The method of claim 2 wherein the field for which data is to be entered is displayed at a first location and the method includes:

creating a new field at a second location.

4. The method of claim 3 wherein the creating step includes entering an alpha character at the second location.

5. The method of claim 4 including, at the conclusion of data entry, the step of:

replacing the field at the first location with the new field.

6. The method of claim 3 wherein:

the data also includes at least one numeric character;

each of the plurality of hard keys is further identified with a different numeric character identified as a default character, and the method includes the step of:

actuating the hard key identified with the numeric character to be entered, thereby also entering the numeric character at the second location.

7. The method of claim 1 wherein each of the plurality of hard keys is identified with two alpha characters and the hard-key actuating step includes displaying a different alpha character at each of the soft keys.

8. The method of claim 1 wherein:

the data includes at least one numeric character;

each of the plurality of hard keys is identified with a different numeric character identified as a default character, and the method includes the step of:

actuating the hard key identified with the numeric character to be entered.

9. A method for entering data comprised of alpha characters and including the steps of:

providing a plurality of hard keys, each of which is identified with two alpha characters:

providing two soft keys;

actuating one of the hard keys, thereby displaying a different alpha character at each of the soft keys;

inadvertently actuating a soft key displaying an undesired alpha character; and actuating the soft key displaying the alpha character desired to be entered, thereby removing the undesired alpha character and substituting therefor the alpha character desired to be entered.

10. The method of claim 9 wherein data may be entered for either of two data fields and the method includes the step of:

selecting the field for which data is to be entered.

11. The method of claim 10 wherein the field for which data is to be entered is displayed at a first location and the method includes:

creating a new field at a second location.

12. In an apparatus for entering data comprised of alpha characters and including a display panel and a keyboard comprised of a plurality of hard keys, and wherein (a) each hard key is identified by two alpha characters, and (b) one of the hard keys is actuated, the improvement wherein:

the hard keys are arranged within an area;

the apparatus includes a plurality of soft keys at locations away from the area, and wherein:

each of the soft keys displays a different alpha character corresponding to one of the alpha characters of the actuated hard key.

13. The apparatus of claim 12 including:

a first data field at a first location;

a second data field at a second location;

an actuated soft key;

and wherein:

the first and second data fields differ from one another; and the second data field includes the alpha character displayed by the actuated soft key.

14. The apparatus of claim 12 wherein each hard key is further identified with a numeric character and the apparatus includes:

a first data field displayed at a first location;

a new data field displayed at a second location;

and wherein:

the first and second data fields differ from one another; and the second data field includes the numeric character identifying the actuated hard key.

* * * * *